United States Patent
Bell, Jr. et al.

(10) Patent No.: US 7,805,574 B2
(45) Date of Patent: Sep. 28, 2010

(54) METHOD AND CACHE SYSTEM WITH SOFT I-MRU MEMBER PROTECTION SCHEME DURING MAKE MRU ALLOCATION

(75) Inventors: Robert H. Bell, Jr., Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/538,091

(22) Filed: Oct. 3, 2006

(65) Prior Publication Data

US 2008/0082754 A1    Apr. 3, 2008

Related U.S. Application Data

(63) Continuation of application No. 11/054,390, filed on Feb. 9, 2005, now Pat. No. 7,363,433, and a continuation of application No. 11/054,067, filed on Feb. 9, 2005, now Pat. No. 7,401,189.

(51) Int. Cl.
*G06F 12/00* (2006.01)
(52) U.S. Cl. .................. 711/133; 711/136; 711/134; 711/135; 711/140
(58) Field of Classification Search .............. 711/136, 711/134, 125, 152, 140, 133, 135
See application file for complete search history.

(56) References Cited

U.S. PATENT DOCUMENTS

| | | | | |
|---|---|---|---|---|
| 5,249,286 A | * | 9/1993 | Alpert et al. | 711/125 |
| 5,353,425 A | * | 10/1994 | Malamy et al. | 711/144 |
| 5,493,667 A | * | 2/1996 | Huck et al. | 711/125 |
| 5,913,224 A | * | 6/1999 | MacDonald | 711/125 |
| 5,974,508 A | * | 10/1999 | Maheshwari | 711/133 |
| 6,823,427 B1 | * | 11/2004 | Sander et al. | 711/136 |
| 6,901,483 B2 | * | 5/2005 | Robinson et al. | 711/133 |
| 6,904,501 B1 | * | 6/2005 | Zhang et al. | 711/134 |
| 6,957,304 B2 | | 10/2005 | Wilkerson | |
| 2006/0179234 A1 | * | 8/2006 | Bell et al. | 711/136 |

OTHER PUBLICATIONS

Konji Inoue., Energy-Security Tradeoff in a Secure Cache Architecture Against Buffer Overflow Attacks, ACM Sigarch Computer Architecture News, Mar. 2005, vol. 33, No. 1, pp. 81-89.

(Continued)

*Primary Examiner*—Christian P Chace
*Assistant Examiner*—Mehdi Namazi
(74) *Attorney, Agent, or Firm*—Dillon & Yudell LLP

(57) ABSTRACT

A caching mechanism implementing a "soft" Instruction-Most Recently Used (I-MRU) protection scheme whereby the selected I-MRU member (cache line) is only protected for a limited number of eviction cycles unless that member is updated/utilized during the period. An update or access to the instruction restarts the countdown that determines when the cache line is no longer protected as the I-MRU. Accordingly, only frequently used Instruction lines are protected, and old I-MRU lines age out of the cache. The old I-MRU members are evicted, such that all the members of a congruence class may be used for data. The I-MRU aging is accomplished through a counter or a linear feedback shift register (LFSR)-based "shootdown" of I-MRU cache lines. The LFSR is tuned such that an I-MRU line will be protected for a pre-established number of evictions.

20 Claims, 7 Drawing Sheets

OTHER PUBLICATIONS

J.H. Chang, H. Chao, and K. So, Cache Design of A Sub-Micro CMOS System/370, ACM 0084-7495/0600-0208$00.75, pp. 208-231.

Seonwoo Kim and Arun K. Somani, Area Efficient Architectures for Information Integrity in Cache Memories, pp. 246-255.

* cited by examiner

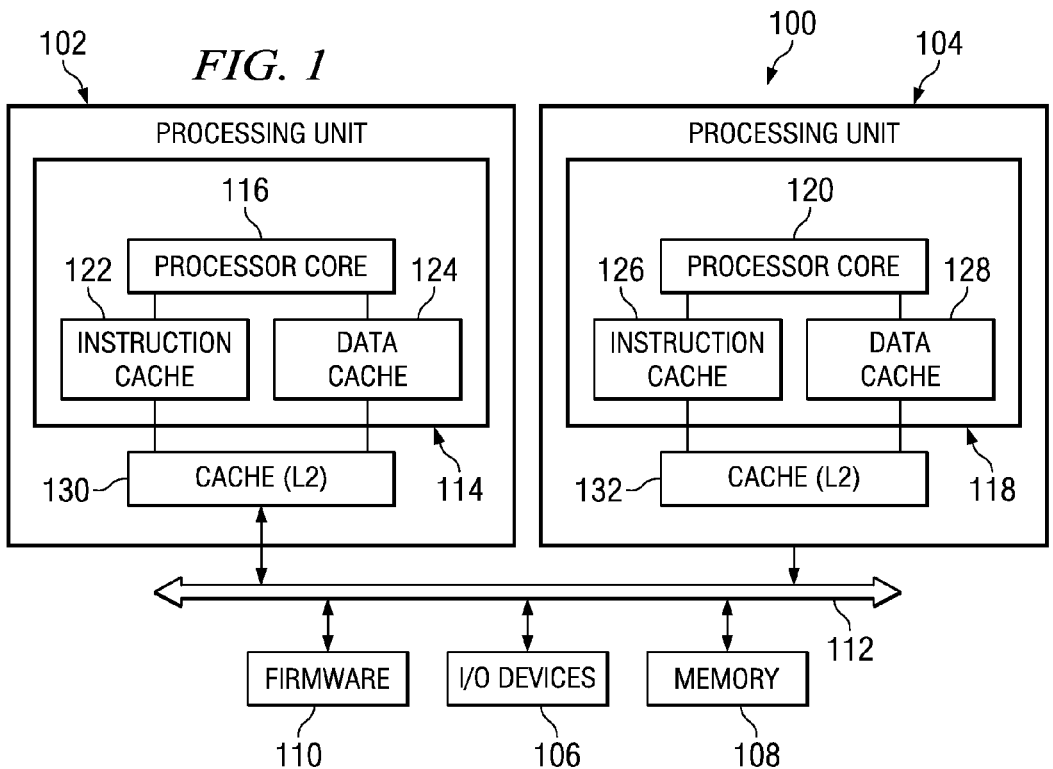
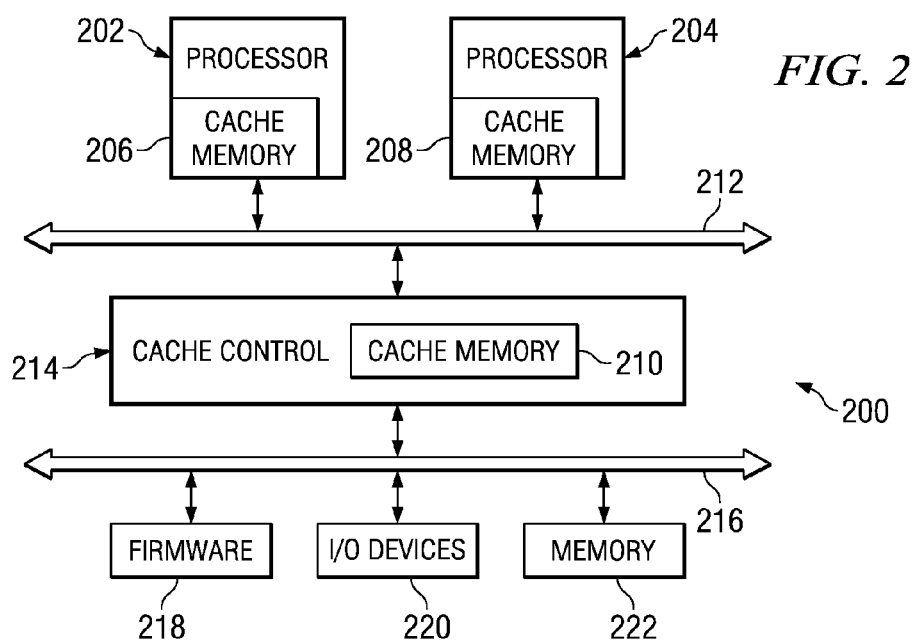

METHOD AND CACHE SYSTEM WITH SOFT I-MRU MEMBER PROTECTION SCHEME DURING MAKE MRU ALLOCATION

CROSS REFERENCE TO RELATED APPLICATION(S)

The present application is a continuation of the following commonly assigned, applications: "Cache Member Protection With Partial Make MRU Allocation," Ser. No. 11/054,390, now U.S. Pat. No. 7,363,433 and "Pipelining D States for MRU Steerage During MRU/LRU Member Allocation," Ser. No. 11/054,067, now U.S. Pat. No. 7,401,189, both previously filed on Feb. 9, 2005. The contents of the above applications are incorporated herein by reference.

BACKGROUND OF THE INVENTION

1. Technical Field

The present invention relates generally to an improved data processing system, and particularly to an improved cache mechanism. Still more particularly, the present invention relates to an improved method and apparatus for completing I-MRU member protection within a cache.

2. Description of Related Art

Using one or more levels of caches to bridge the performance gap between a processor and main memory is a well established feature in data processing systems. When the processor issues a memory access request, the requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

Caches often employ a set associative scheme by which the cache is partitioned into distinct classes of lines, wherein each class contains a small fixed number of lines. The classes of lines are usually referred to as "congruence classes." The lines in a congruence class (which indicate the number of locations in which an address can reside) are usually referred to as sets in a set associative cache.

One generally used type of replacement policy is the least recently used (LRU) policy. An LRU policy is built upon the premise that the least recently used cache line in a congruence class is the least worthy of being retained. So, when it becomes necessary to evict a cache line to make room for a new one, an LRU policy chooses as a victim a cache line which is the least recently accessed set (or member) within a congruence class.

Within an LRU policy, two types of operations are typically carried out against the LRU state (which is maintained for each congruence class in a cache).

A most recently used-update (MRU-update) operation typically occurs due to a cache hit. The MRU-update adjusts the LRU state such that the "hit" member is ordered ahead of all other members in that congruence class, establishing the cache line in that member position as the most worthy member in the congruence class.

A least recently used-victim-selection (LRU-victim-selection) operation typically occurs when a cache miss requires that a member be allocated to hold a cache line arriving from elsewhere in the storage hierarchy. The operation determines which cache line is the least worthy of being retained in the congruence class, evicts that cache line, and places the newly arriving cache line in the member's position.

Several factors complicate the behavior of LRU replacement policies in multi-level cache hierarchies, particularly when those hierarchies contain nth level caches that are shared by multiple structures at level n−1. For example, a processor may contain a first level instruction cache and a first level data cache. These may be backed by a second level cache that includes both instructions and data. Such a structure is designed so that processor requests for cache lines that miss in the first level caches have a high likelihood of being found in the second level cache.

As described earlier, the LRU replacement policy in the first level caches would update as "most-recently-used" those cache lines that are used most often by the processor. Cache lines that are less important (or worthy) to the processor, since they are used less often, would be less likely to be marked as most-recently-used. Thus, the more frequently used lines tend to remain in the first level cache, while the less frequently used lines tend to be evicted from the first level cache.

The LRU policy in the second level cache would update as most-recently-used those cache lines that are requested from the second level cache when a first level cache miss occurs. These lines would tend to be those lines which were evicted from the first level cache, and are less worthy to the processor than the cache lines which tend to hit in the first level caches. Thus, the cache lines that most often are not found in the first level caches, but are repeatedly needed by the processor, are the cache lines most likely to remain in the second level cache, due to the fact that they are more likely to be beneficially affected by MRU-updates.

A large number of applications have a small instruction footprint and larger data requirements, resulting in "unbalanced" caching behaviors, wherein the instructions that are utilized most often by the processor are frequently evicted from the L2 cache. Thus, cache lines which are most worthy to the processor are less likely to benefit from MRU-updates in the second level cache, and hence, are more likely to be evicted from the second level cache than the cache lines which are less worthy to the processor.

Previous methods have been provided for protecting specific instructions required at the first level cache from being evicted from a second level (L2) cache. With these methods, the L2 cache LRU algorithm contains a pointer to protect the instruction most recently used (I-MRU) line for each congruence class in the L2 cache. This reserved 'way' is in place to prevent technical codes (with a small Instruction ("I") footprint, but large data footprint) from "thrashing" the I footprint. This conventional method would essentially protect one full 'way' of the cache. For example ⅛ of an 8 way set associative cache would be reserved for instructions. In addition, the asymmetry of the remaining data ways combined with typical pseudo-lru algorithms produced sub optimal behavior for some workloads.

Therefore, the present invention recognizes that it would be advantageous to have an improved method, apparatus, and computer system for reducing the sub-optimal performance exhibited from the continued protection of old instructions lines that are currently protected via I-MRU policies from being evicted from a second level, inclusive cache.

SUMMARY OF THE INVENTION

Disclosed is a method and apparatus for limiting the length of time an old Instruction-most recently used (I-MRU) line is protected within a congruence class of a cache during MRU member allocation within LRU victim selection processing. MRU update logic is augmented with logic to determine a number of eviction cycles that have elapsed since the I-MRU member/line was initially selected for I-MRU protection. A maximum number of eviction cycles is pre-established after which a line provided with I-MRU protection is considered "old" and no longer deserving of protection.

A counter/timer is utilized to track the number of elapsed cycles following the initial selection by MRU update logic of an I-MRU member for protection. In one embodiment, the congruence class includes 8 members, and the LRU state array includes three additional protection bits, which represent the value of the particular member (0-7) within the congruence class that is to be protected from eviction out of the cache. The particular member identified by the protection bits is protected from selection as the next LRU victim by tagging the member as I-MRU during each subsequent pass through the MRU update logic. This I-MRU protection of the cache line continues until one of several conditions occur, including: (1) the MRU update logic selects a different member for I-MRU protection; (2) the I-MRU member becomes Invalid; or (3) the pre-established number of eviction cycles completes without the line/member being accessed/utilized. When the third condition occurs, the MRU update logic deselects the old I-MRU line, making the line eligible for selection for LRU eviction.

According to one embodiment, MRU update logic is modified to track the number of elapse eviction cycles via a software-enabled counter/timer for each congruence class. A timer function is associated with the MRU allocation logic, wherein the member that is assigned an I-MRU status is only protected for a pre-established number of eviction cycles. Once the number of eviction cycles elapses without a new member being selected as the I-MRU, the old I-MRU line is no longer protected and is made available for selection for LRU eviction. The old I-MRU line may then be evicted from the cache in subsequent LRU eviction cycles, and the line may then be utilized to store data. The counter/timer embodiment allows for resetting of the lifetime of an I-MRU member in the event of subsequent accesses.

In another embodiment, a linear feedback shift register (LFSR) is added to MRU update logic to represent counter/timer features. The LFSR is tuned such that an I-MRU line will be protected for a pre-established probabilistic number of evictions. The LFSR overloads the encoding of the protection bits so that the protection bits no longer indicate a particular member of the congruence class. The LFSR embodiment removes the requirement for an array of timers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in which an embodiment of the present invention may be implemented;

FIG. 2 is a diagram of another data processing system in which the present invention may be implemented;

DETAILED DESCRIPTION OF AN ILLUSTRATIVE EMBODIMENT

Figure 3A:
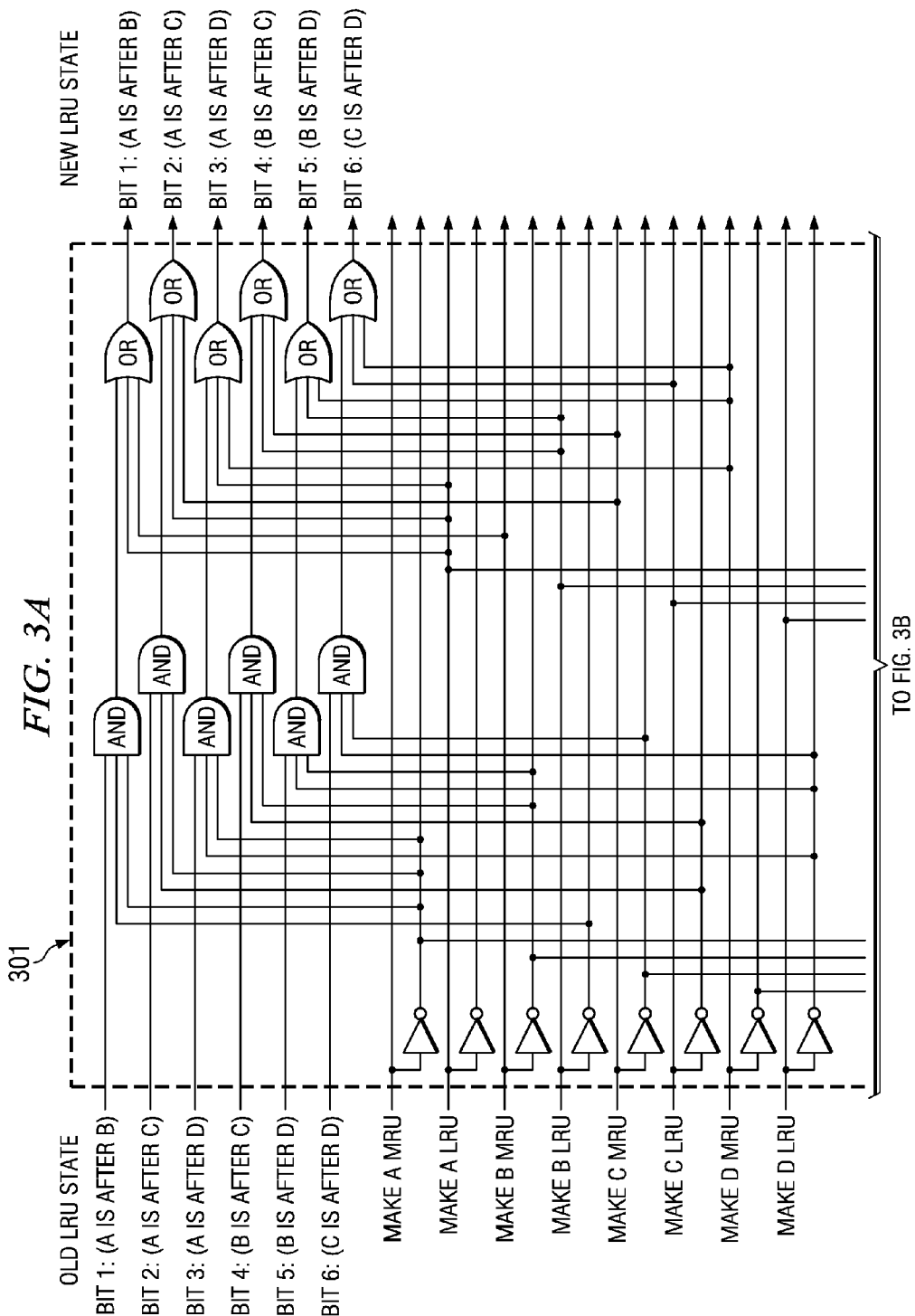
FIGS. 3A-3C represent a circuit diagram of an exemplary MRU update function, which has been augmented with time-limited member I-MRU protection capabilities in accordance with embodiments of the present invention.

With reference now to the figures and in particular with reference to FIG. 1, there is depicted a block diagram of a data processing system in which an illustrative embodiment of the present invention may be implemented. Data processing system 100 is an example of a conventional multi-processor computer system. Data processing system 100 has several processing units, of which processing unit 102 and processing unit 104 are depicted. These processing units are connected to various peripheral devices, including input/output (I/O) devices 106, memory 108, and firmware 110, whose primary purpose is to seek out and load an operating system from one of the peripherals whenever the computer is first turned on. I/O devices 106 may include a display monitor, keyboard, and permanent storage device, for example Processing units 102 and 104 communicate with the peripheral devices by various means, including, for example, a generalized interconnect or bus 112. Data processing system 100 may have many additional components which are not shown, such as serial and parallel ports for connection to devices, such as modems or printers. Those of ordinary skill in the art will further appreciate that there are other components that might be used in conjunction with those shown in the block diagram of FIG. 1. For example, a display adapter might be used to control a video display monitor, and a memory controller may be used to access memory 108. Also, the data processing system 100 may have more than two processing units.

In a symmetric multi-processor (SMP) computer, all of the processing units are generally identical. In other words, the processors all use a common set or subset of instructions and protocols to operate, and generally have the same architecture. A typical architecture is shown in FIG. 1. In these examples, processing unit 102 includes integrated chip 114, which contains processor core 116, and processing unit 104 contains integrated circuit 118, which contains processing core 120, instruction cache 126, and data cache 128. Processor cores 116 and 120 include registers and execution units. These components are used to carry out program instructions to operate data processing system 100.

As illustrated, processing unit 102 and processing unit 104 also include caches, such as instruction cache 122, data cache 124, instruction cache 126, and data cache 128, within respective integrated circuits 114 and 118 in FIG. 1. These caches are implemented using high speed memory devices. Caches are commonly used to temporarily store values that might be repeatedly accessed by a processor, in order to speed up processing by avoiding the longer latency of loading the values from memory 108. These caches are referred to as "on-board" when they are integrally packaged with the processor core on a single integrated chip. In these examples, the caches located within integrated circuit 114 and integrated circuit 118 are level 1 (L1) caches. Each cache is associated with a cache controller (not shown) that manages the transfer of data between the cache memory and processor core and/or the lower level memory.

A processing unit may include additional caches. For example, processing unit 102 includes cache 130 and processing unit 104 includes cache 132, which are referred to as level 2 (L2) caches. L2 cache 130 and L2 cache 132 act as intermediaries between memory 108 and the on-board L1 caches: instruction cache 122, data cache 124, instruction cache 126, and data cache 128. These L2 caches store a much larger amount of information (e.g., instructions and data) than the on-board caches, but with a longer access penalty. For example, cache 130 and cache 132 may be integrated in chips and have a storage capacity of 256 or 512 kilobytes, while instruction cache 122 and data cache 124 in processing unit 102 and instruction cache 126 and data cache 128 in processing unit 104 may have only 64 kilobytes of total storage.

As illustrated, both cache 130 and 132 are connected to bus 112. All loading of information from memory 108 into processor core 116 passes through cache 130, while all loading of information into processor core 120 passes through cache 132. Although FIG. 1 depicts only a two-level cache hierarchy, multi-level cache hierarchies may be provided where there are many levels of serially-connected caches. For example, L3, L4, and L5 caches may be provided.

In the following detailed description of illustrative embodiments of the invention, specific illustrative embodiments by which the invention is practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Also, within the descriptions of the figures, similar elements are provided similar names element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

With reference now to FIG. 2, a diagram of another data processing system is depicted in accordance with an illustrative embodiment of the present invention. The processes and apparatus of the present invention may also be implemented within data processing system 200. This particular example illustrates a shared L2 cache, while data processing system 100 in FIG. 1 illustrates unshared caches.

In this example, data processing system 200 includes two processors, processor 202 and processor 204. Cache memory 206 and cache memory 208 are cache memories located within processor 202 and processor 204, respectively. In this example, cache memory 210 is a level 2 cache memory that is shared by both processors. Access to this cache memory is provided by bus 212. Cache control 214 contains logic for handling cache lines within memory 210 in response to requests from processors 202 and 204. Cache control 214 is connected to other components via bus 216. For example, firmware 218, I/O devices 220 and memory 222 are connected to bus 216.

Data processing system 100 and data processing system 200 include mechanisms for handling cache lines, specifically cache lines that store a most recently fetched instruction. As described in greater details below, the present invention provides a method, apparatus, and computer system for enhancing selection and subsequent release of an Instruction cache line as an I-MRU protected member.

The replacement policies for cache lines, particularly LRU replacement policies are described in detail within commonly assigned, co-pending applications, Ser. No. 11/054,390 and Ser. No. 11/054,067, previously incorporated herein by reference. Only portions of that description which affect the make MRU process is described herein. The features of the present invention are related to the I-MRU member protection features within the cache topology and LRU eviction methods/mechanisms described by these related application. The invention then provides further modifications/enhancements to the MRU member protection features, as described in greater details below.

As previously mentioned, certain operations are occasionally desired to be protected from being selected as victims during LRU victim selection, such as when unbalanced caching behavior occurs (high turnover of data cache lines with low turnover of instruction cache lines). Thus, the present invention provides a method and apparatus for enabling optimal time-controlled protection of a particular MRU instruction cache line (member of a congruence class) during LRU victim selection. In the specific illustrative embodiment, the congruence class includes 8 members, and three additional protection bits are utilized to point to the particular member (0-7) within the congruence class that is to be protected from eviction out of the cache.

As described within the related applications, an MRU-update operation is accomplished by setting member protection bits to a constant pattern (associated with the updated member) while leaving the other bits in the vector unchanged. The subset is comprised of the n−1 bits (where n is the associativity of the cache) which define the ordering between the updated member and each of the other members in the congruence class.

It should be noted that the particular implementation in which three bits are utilized as the member protection bits works for the 8 bit congruence class example. The actual number of bits required is N, where N is an integer such that $2^N$ is greater than or equal to the number of members in the congruence class.

During processing of an operation directed at the cache request, the protection bits are pipelined to MRU update logic contemporaneously with other information provided during LRU victim selection and MRU steerage for I-states. MRU update logic is augmented with logic to decode the value of the protection bits to generate a corresponding MRU vector, which is logically ORed with any other MRU vectors within the MRU update logic to create a single MRU input vector. The MRU update logic also includes logic for overriding the default "make MRU" handling of the protected member when that member is determined to be Invalid. Additionally, according to the invention, the MRU update logic is augmented with logic to prevent old I-MRUs from continuing to be protected.

The core function provided by this additional logic is providing a mechanism for determining a number of eviction cycles that have elapsed since an I-MRU line was initially selected for MRU protection. A counter/timer (or linear feedback shift register (LFSR)) is utilized to track the number of elapsed cycles following the initial selection by MRU update logic of an I-MRU member for protection. The particular member identified by the protection bits is protected from selection as the next LRU victim by tagging the member as I-MRU during each subsequent pass through the MRU update logic. A maximum number of eviction cycles is pre-established, after which a selected line provided with I-MRU protection is considered "old" and no longer deserving of protection. This pre-established number of cycles is a design characteristic, which may be adjusted by a system engineer.

With this additional logic, the I-MRU protection of the cache line continues until one of several conditions occur, including: (1) the MRU update logic selects a different member for I-MRU protection; (2) the I-MRU member becomes Invalid; or (3) the pre-established number of eviction cycles completes without the line being accessed/utilized. When the third condition occurs, the MRU update logic de-selects the old I-MRU line, making the line eligible for selection for LRU eviction.

According to one embodiment, MRU update logic is modified to track the number of elapse eviction cycles via a software-enabled counter/timer for each congruence class. A timer function is associated with the MRU allocation logic, wherein the member that is assigned an MRU status is only protected for a pre-established number of eviction cycles. Once the number of eviction cycles elapses without a new member being selected as the I-MRU, the old I-MRU line is no longer protected and is made available for selection by LRU selection. The old I-MRU line may then be evicted from the cache in subsequent LRU eviction cycles, and the line may then be utilized to store data. The counter/timer embodiment allows for resetting of the lifetime of an I-MRU in the event of subsequent accesses.

In another embodiment, a linear feedback shift register (LFSR) is added to MRU update logic to provide the counter/timer features. The LFSR is tuned such that an I-MRU line will be protected for a pre-established probabilistic number of evictions. The LFSR also overloads the encoding for the protection bits so that the protection bits no longer indicate a particular member of the congruence class. The LFSR embodiment removes the requirement for an array of timers.

In the illustrative embodiment, the congruence class includes 8 members, and the LRU state array includes three additional protection bits, which represent the value of the particular member (0-7) within the congruence class that is to be protected from eviction out of the cache. The particular member identified by the protection bits is protected from selection as the next LRU victim by tagging the member as MRU during each subsequent pass through the MRU update logic until: (a) a different member is selected for protection; or (b) the member becomes invalid; or (c) the member times out as a protected member, as described herein. As described below, augmented MRU update logic (512) is expanded to include several logic components required to support the time-limited I-MRU member protection functionality associated with the protection bits.

The protection bits serve as a pointer that identifies the specific location of the member/cache line that is to be preserved (i.e., one of members 0-7, mapping to cache lines A-H in an 8 member congruence class). The particular member that is identified by this pointer is made I-MRU and is thus protected from selection as a victim during LRU victim selection for a pre-specified number of eviction cycles, unless that member is Invalid or is replaced by another member as the I-MRU. Thus, the protected member is only victimized if the line becomes invalid or the line's protection status time-outs before the line is accessed/utilized by the processor.

For purposes of the invention, a most recent Instruction fetch (I-fetch) operation triggers protection of the member in which the instruction is stored. The operation of the MRU update logic then protects the most recently fetched instruction (referred to as the instruction most recently used, I-MRU, herein) within the congruence class until expiration of the time count. When a new operation with the desired attribute (i.e. instruction fetch) is detected, however, the pointer is changed to point to the member storing the new I-MRU.

Figure 4:
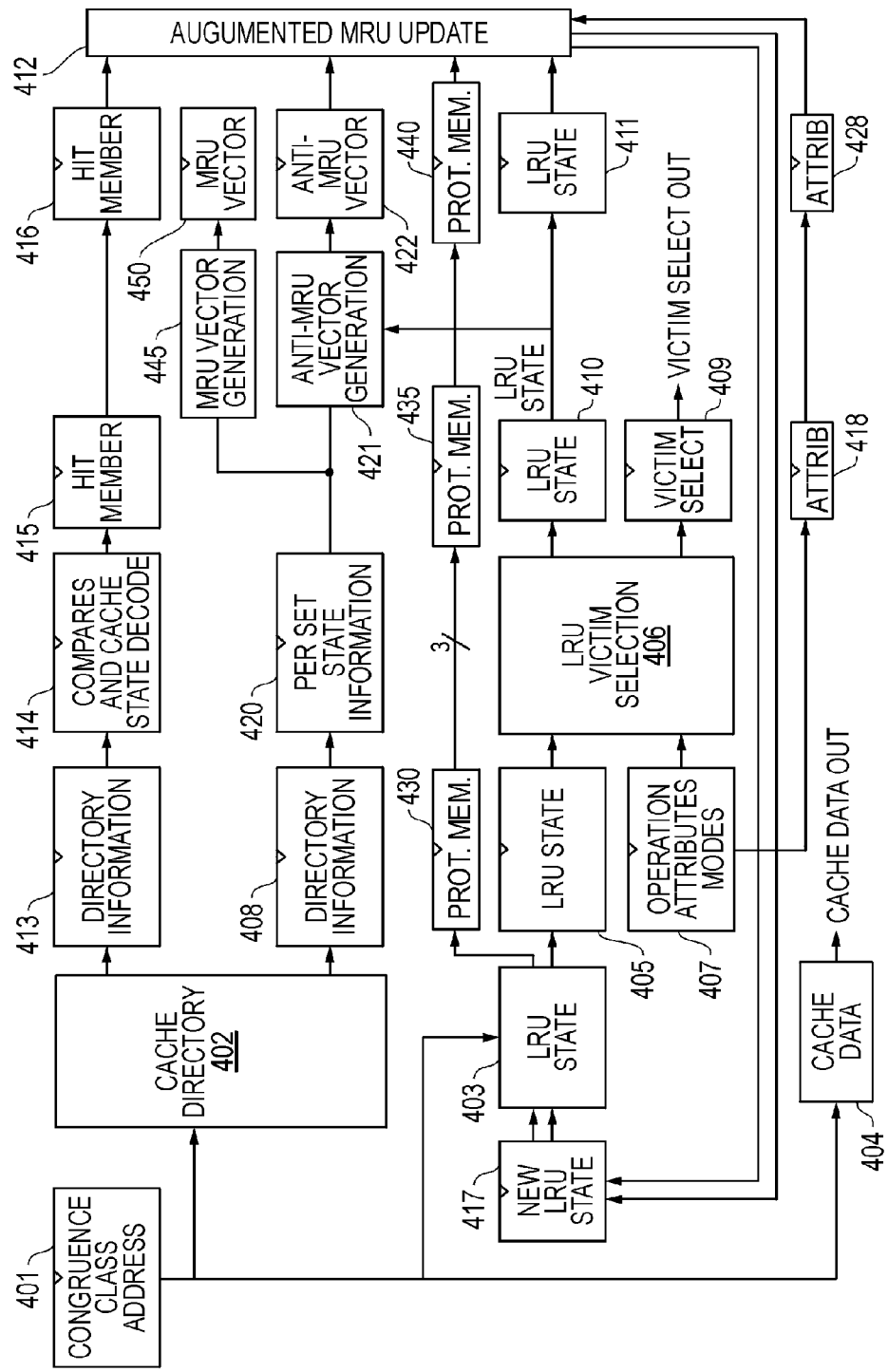
FIG. 4 is a cache architecture including an expanded LRU array with member protection bits, which are pipelined to the MRU update logic to protect a selected member for a pre-established number of eviction cycles in accordance with illustrative embodiments of the present invention.

FIG. 4 illustrates an expanded block diagram representation of a cache architecture in which the member protection bits are pipelined from LRU state array to MRU update logic. As illustrated, the protection bits are latched through a series of latches, while LRU victim selection with I-state biasing and D-state steerage to MRU is being carried out (see related applications). D-state steerage to MRU occurs independent of the pipelining and processing of the member protection bits, and that process is described in co-pending, related patent application, which has also been previously incorporated herein by reference.

The description of FIG. 4 focuses on the pipelining of the member protection bits and associated functionality. Additional logic required to complete the actual determination and final selection of the protected member for MRU protection are provided in the logic diagram of FIGS. 5A and 5B.

The cache congruence class index (or address) is held in latch 401. From there, the address is simultaneously routed to the directory array 402, the LRU state array 403, and, for operations which speculatively read the cache, to the data array 404.

From LRU state array 403, the 13 state bits for the accessed congruence class is read and deposited into latch 405. Victim selection logic 406 selects a victim, and the selected victim member position is deposited in latch 409. Victim selection logic 406 then passes along some or all of the LRU state information to MRU update logic 412, via pipelined latches 410 and 411. As described above, the "hit member" information is deposited into latch 415, and pipelined forward to latch 416, from which the information is routed to MRU update logic 412. Further, anti-MRU logic generates an anti-MRU vector, which is also routed from latch 422 to MRU update logic 412.

Contemporaneously with the above processes, the member protection bits are placed into first latch 430 and passed to MRU update logic 412 via pipelined latches 435 and 440. The use of pipelined latches 435 and 440 enables member protection bits to arrive at augmented MRU update logic 412 at substantially the same time as the LRU state information, hit member vector (from latch 416) and anti-MRU vector (from latch 422).

Also, as the member protection bits are being passed through the cache circuitry, attributes of the operation are latched at operation attribute latch 407 and these attributes are pipelined to MRU update logic 412 via latches 418 and 428. The attributes are utilized in the selection process for determining when a new member (i.e., a different instruction) is to be selected for protection. In one embodiment, the attributes indicate whether or not the operation is an instruction fetch (I-fetch) operation, and the protection bits are updated so that they point to the member hosting the fetched instruction.

The following present description references the other illustrative inputs only where they impact the processing of the member protection bits as related to the present invention. Most important for the present invention(s) is the information related to the protected member (from latch 440).

According to the invention augmented MRU update logic 412 takes advantage of a property of chronology vectors, which property allows multiple update operations to be carried out upon a chronology vector simultaneously. Utilizing this property, the MRU update function is able to perform multiple make MRU updates and multiple "anti-MRU" updates simultaneously. When taking advantage of chronology vectors to perform multiple updates simultaneously, the ordering is biased either toward "1" encodings (set-dominant) or "0" encodings (reset-dominant).

Figure 3B:
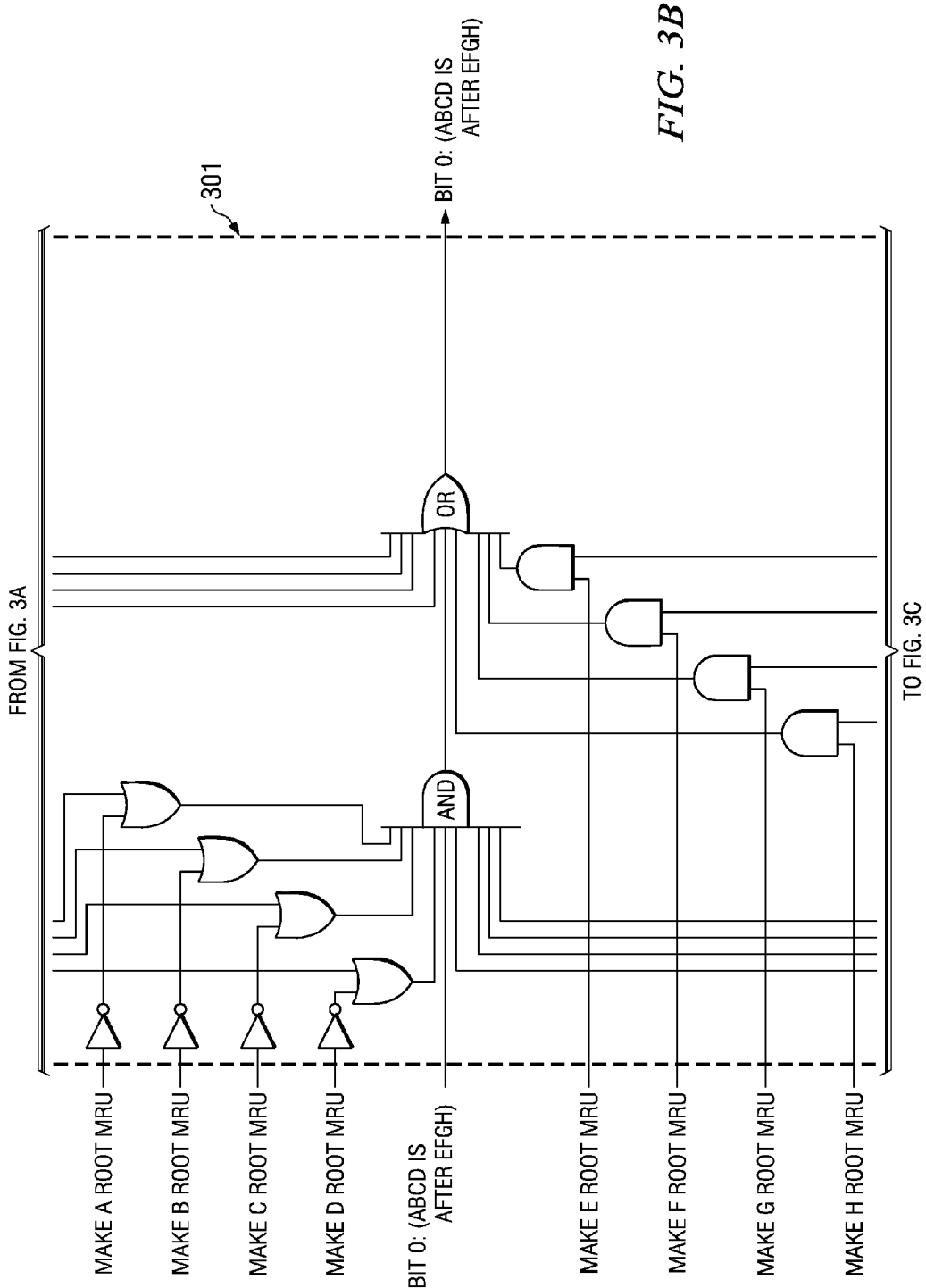
Figure 3C:
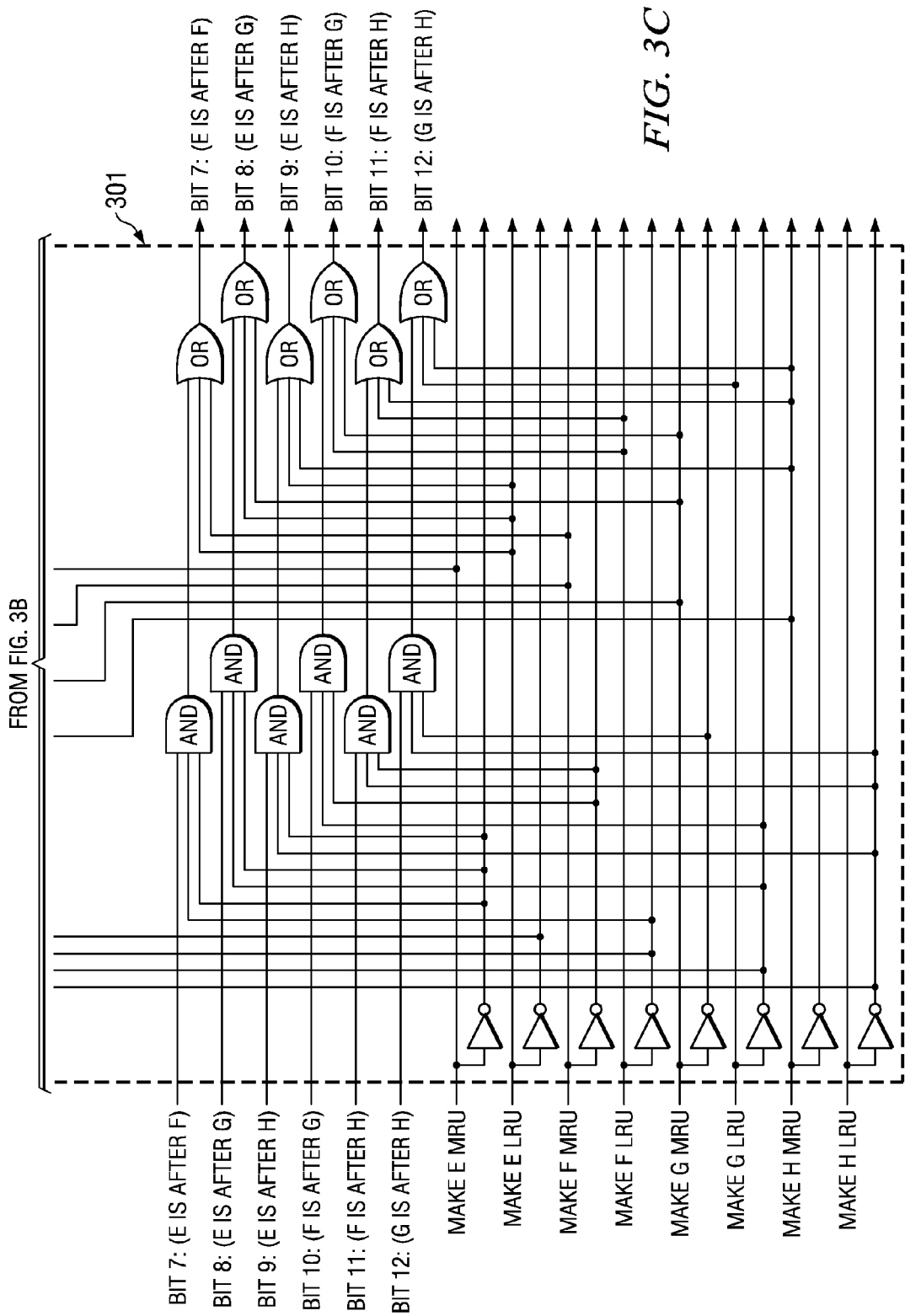

FIGS. 3A-3C illustrate an internalized view of the circuitry within make MRU/LRU logic 526. Specifically, FIG. 3B illustrates the new set of inputs to the circuit, make root MRU, which determine whether the root bit is to be toggled during a make MRU process. The general functionality associated with the generation of these inputs as well as other features of the invention are now described. As will be clear with the below description of FIGS. 5A and 5B, the make root MRU input is triggered only when a make MRU function is triggered that results from a hit or victim member selection.

Figure 5A:
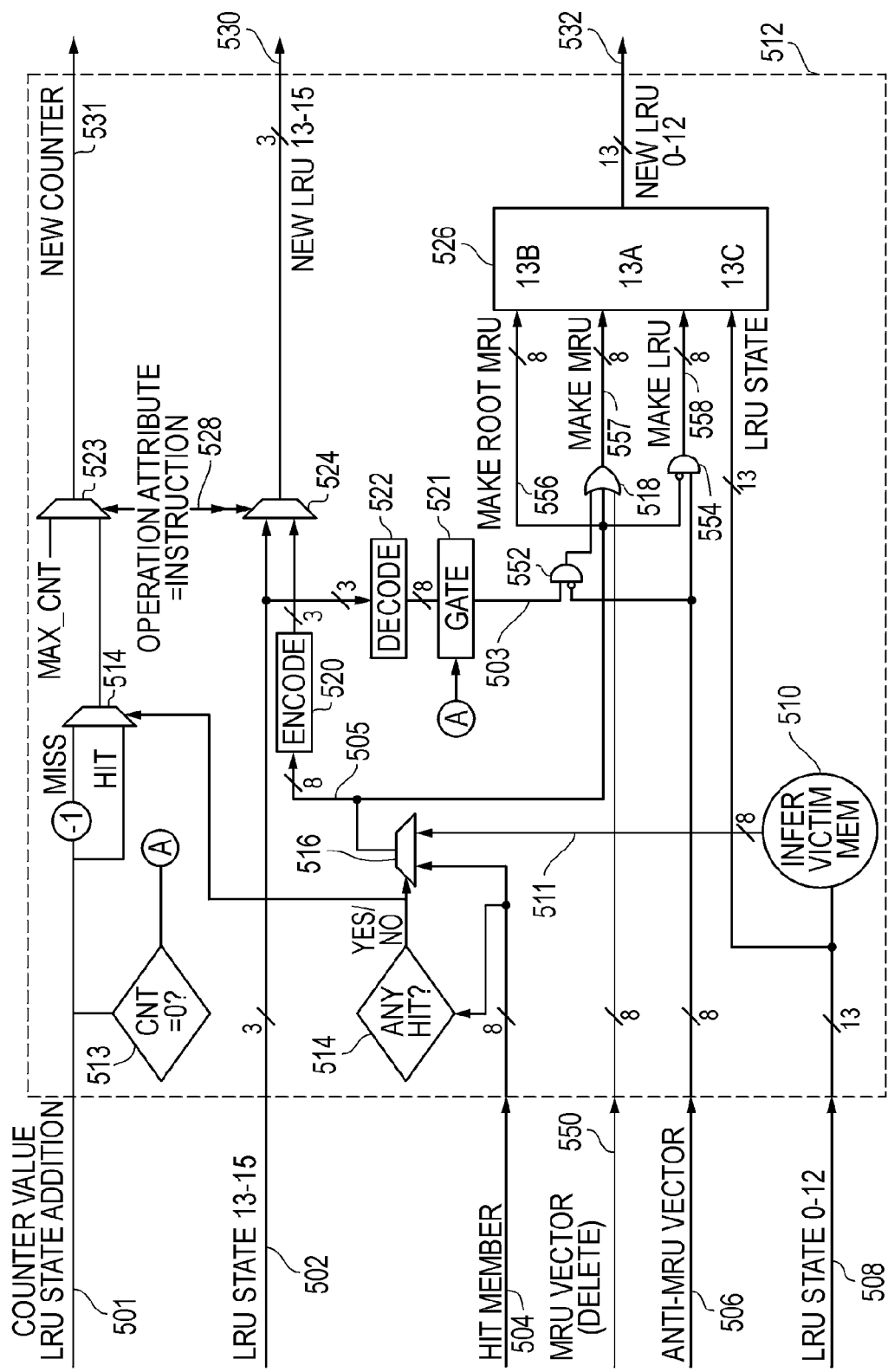
FIGS. 5A and 5B are block diagrams illustrating two embodiments of logic components of the MRU update logic, which are respectively configured with a counter and an LFSR to support time-limited I-MRU allocation for valid, protected members in accordance with illustrative embodiments of the present invention.

Turning now to FIG. 5A, there is illustrated a block diagram representation of augmented MRU updated logic 512, which includes additional logic components required to provide the time-limiting I-MRU protection features of the invention. Within Figure A, augmented MRU updated logic 512 receives as input (1) LRU state vector 508 (a 13 bit wide input vector representing the current LRU states), (2) anti-MRU vector 506 (an 8 bit wide vector that feeds into AND/NOT gate 554, which feeds the make MRU input to make MRU/LRU logic 526), (3) hit member vector 504 (also an 8 bit vector that feeds into MUX 516, whose functionality is described below), and (4) member protection bits 502 (LRU state bits 13-15 identifying a pre-selected member that is to be protected). According to the invention, MRU update logic 512 also receives additional counter bits 501 associated with member protection bits 502, and utilized as described below.

In addition to the above inputs, an MRU vector 550 (an 8 bit vector representing Delete state member(s)) is illustrated. However, the functionality associated with MRU vector 550 is described in the co-pending patent application.

Augmented MRU update logic 512 includes make MRU/LRU logic 526, which receives four sets of inputs. These inputs are: (1) 13 bit LRU state vector 508; (2) 8 bit make LRU vector 558; (3) 8 bit make MRU vector 557; and (4) 8 bit make root MRU vector 556. The 13 bit LRU state vector, received directly from staging latch 411, has been previously described. Each of the other inputs are derived from a selection process/pipeline, including one or more logic components and multiple permutations of the above inputs to MRU update logic 512. For example, with the addition of the member protection bits and D-state vector, three sets of inputs are ORed together to provide the single "make MRU" input vector.

Member protection bits 502 are routed to decode block 522, which converts the 3 bit input into an 8 bit vector (member protection vector 503), each bit representing a member within the congruence class with the bit corresponding to the protected member set to logic 1, while all other bits are set to logic 0. This member protection vector 503 is then routed through "zero count" gate 521 and then to AND/NOT gate 552. AND/NOT gate 552 also receives anti-MRU vector 506 as an input from latch 422. AND/NOT gate 552 inverts the anti-MRU vector, and the combination of both inputs allows an MRU update for the member when the member is not Invalid.

In accordance with embodiments of the invention, additional logic is provided, which establishes a mechanism for (a) tracking a number of elapsed eviction cycles through which a particular member is protected and (b) triggering a removal of protected status from the particular member. FIG. 5A illustrates a first embodiment, which provides a counter update/reset path. Counter value 501 is provided as an LRU state addition. For example, the counter may comprise additional LRU state bits 16-18, representing a maximum counter value of 8 (binary 000). Counter value 501 is fed into three paths, with a first path illustrated as a Hit path, a second parallel path illustrated as a miss path (with a counter decrement logic), and the third path illustrated as the expired counter path. When propagated on miss path, counter value is decreased by 1, corresponding to the passage of another eviction cycle since the I-MRU member was last protected due to a hit at that member. Both hit and miss paths are inputs to counter update MUX 515. Counter update MUX 515 receives a select input from Hit determining logic 514, and the select input causes counter update MUX 515 to select (a) the hit path input when a hit occurs and (b) the miss path input (counter-1) when a hit does not occur.

The selected input is then passed to new counter determining MUX 523, which is responsible for selecting when to pass the current counter value through to the next cycle or generate a new counter with maximum counter value. Thus, as shown, MUX 523 receives a first input of the counter value from MUX 515 and a second input of the maximum counter value (Max_Cnt). The input selection at MUX 523 is then determined based on whether the hit member is an instruction (i.e., the current instruction or a new instruction). If the hit member is not an instruction, the decreased counter value from MUX 515 is passed as the new counter value 531 for the next eviction cycle. However, if the hit member was an instruction, then a new counter is established with new counter value 531 being the maximum counter value (e.g. 111).

The expired counter path comprises a "counter=0" determination logic 513, which evaluates whether the current counter value equals 0. When the value equals zero, a signal is sent to MRU-enable (or zero count) gate 521. MRU enable gate 521 permits passage of output from decode block 522, which is the 8 bit vector of the congruence class with a single bit tagged make I-MRU. When gate 521 receives a signal from logic 513, gate 521 toggles all 8 bits to zero such that no member is tagged as make I-MRU. That is, gate 521 removes the make I-MRU status from the bit that was previous tagged make I-MRU. In this manner, no member is allowed to remain I-MRU protected beyond expiration of the counter.

In one embodiment, gate 521 is an AND gate (or series of AND gates) and receives the 8 bit vector as 8 individual vector lines. The AND gate also receives the signal from logic 513 as the second input. When counter value 501 is not zero, logic 513 transmits a 1 value as the signal to AND gate. The I-MRU member (with counter line set to 1) then receives a 1 output from AND gate when its vector line is ANDed with the signal from logic 513, while all other vector lines yield a zero output. However, when the counter value 501 is 0, a 0 signal is passed from logic 513, and I-MRU member's vector line is changed to zero when ANDed with the 0 input signal.

Figure 5B:
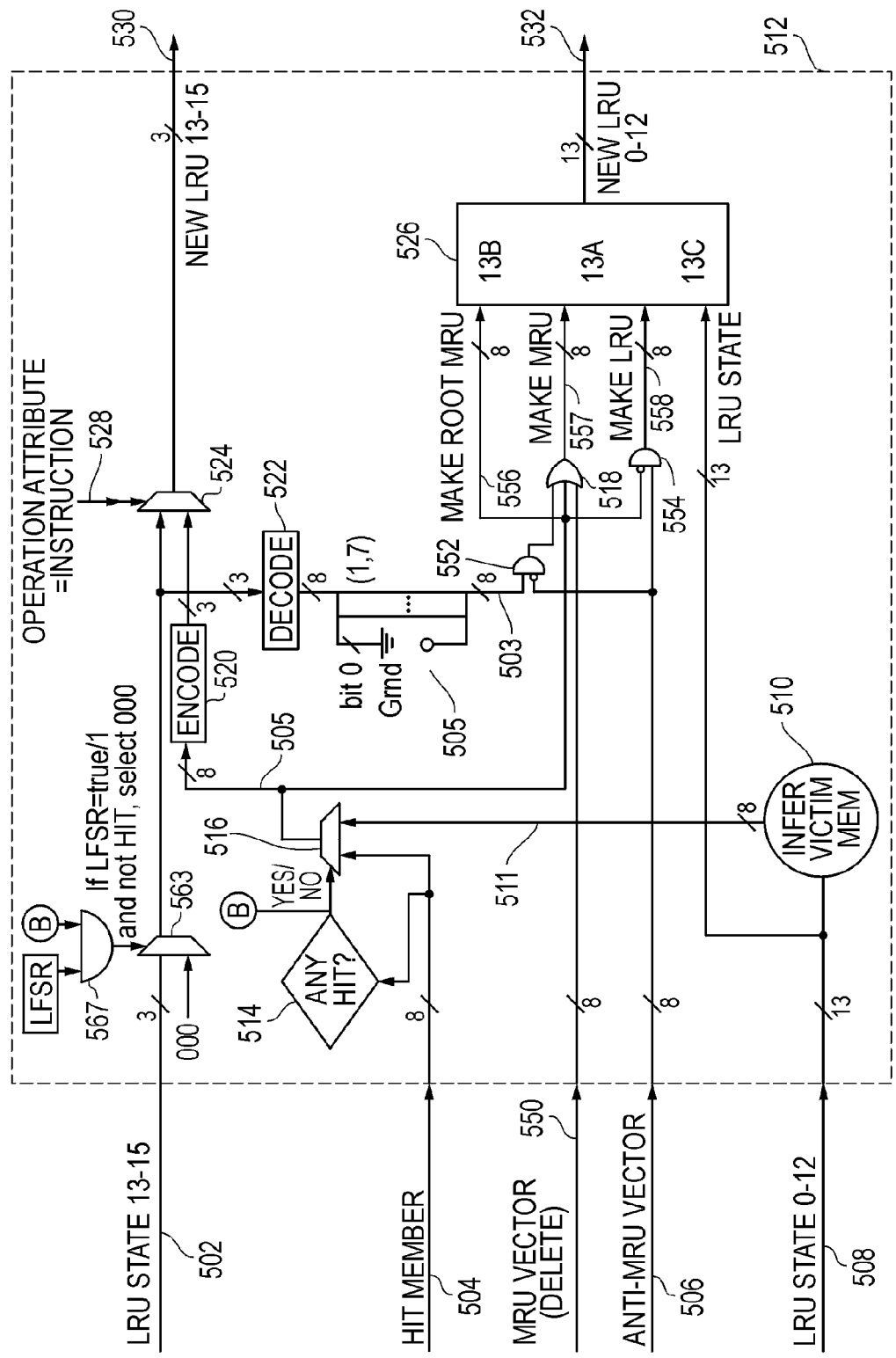

Referring now to FIG. 5B, there is illustrated the second embodiment in which an LFSR is utilized to provide the time-limiting features for make MRU functionality, according to the invention. With the second embodiment, the 000 member of LRU state bits 13-15 is biased to never be protected. Thus, the 000 encoding of LRU state bits produces a make MRU vector of '00000000'. Biasing of the 000 bit is completed using "0 line biasing" configuration 505, by which the "0" vector line decoded from LRU state bits is grounded, while the remaining decoded vector lines (1-7) are provided as vector line input 503 to AND/NOT Gate 552. As further illustrated, state bit selection MUX 563 is added to the input path for LRU state bits 502. MUX 563 then receives a second input of '000'. The selection of an input at MUX 563 is dependent on two factors: (a) whether LFSR="true" (i.e., input value 1) and (b) whether there is a hit (514). When LFSR="true" and there is not a hit, the select input of MUX 563 selects 000 as the LRU state to propagate through MRU selection logic (512). Otherwise, select input selects LRU state bits 502. An example LFSR 563 is illustrated providing a single input to AND/NOT Gate 565, which also receives an output of Hit/Miss logic 514 as a second input. As illustrated, the B input is assumed to be indicative of "not a hit", i.e., a miss. Also, LFSR is assumed to be true as a default. Both inputs thus provide a logic 1 when both condition are true.

The selected input from MUX 563 is then passed to decode logic 522, which decodes the LRU state input into the respective eight vector lines (bits 0-7) in the "0 line biasing" configuration 505. As shown, vector line for bit 0 is grounded such that bit 0 may never be selected as the I-MRU member. Each other vector line (1-7) within configuration 505 is represented and passed to AND/NOT gate 552.

LFSR is utilized to toggle the bits of member protection bits 502 and overload the bits, so as to remove the selected member as an I-MRU member. Thus, all bits of the 8 bit member protection vector 503 are toggled to 0 based on the LFSR status. With no bit having a value of 1 when member protection vector 503 is passed through AND/NOT gate 552, no member is identified as the I-MRU member. The previous protection applied to the old I-MRU is therefore removed.

The LFSR is tuned such that an I-MRU line will be protected for a pre-established probabilistic number of evictions. With this embodiment, a single LFSR is utilized to provide the time-limiting MRU protection features for all congruence classes. Notably, the embodiment illustrated by FIG. 5A requires an array of timers/counters, one for each congruence class. Other logic means may be utilized in lieu of or along with an LSFR to achieve the similar de-selection of an old I-MRU from being protected. For example, one embodiment may utilize both the counter values as well as the LFSR by adding bit lines to the LRU state bits.

The anti-MRU vector is used to find an Invalid cache line and make it LRU. Making the cache line LRU conflict with any attempts to make the protected member MRU, and the conflict is resolved in favor of the inverted anti-MRU input overriding the "default" make MRU status of the previously protected member.

A 0 output of the AND/NOT gate 552 disables/turns off the make MRU function for that member and thus makes the member eligible for victim selection as an Invalid member. A 1 output, however, results in the member being made MRU, indicating that the member is valid and is protected from victim selection.

The output of AND/NOT gate 552 represents one input to OR logic 518, which receives two additional inputs, MRU vector 550 and the output 505 from MUX 516. MRU vector 550 or "delete" MRU vector is described in related, co-pending patent application. The three inputs are ORed together to provide a single make MRU vector 557 that is inputted to make MRU/LRU logic 526.

MUX 516 receives as its inputs hit member vector 504 and select victim member vector 511 (from infer victim member logic 510). MUX 516 also receives a (single bit) select input from hit determining logic 514. Hit determining logic 514 indicates when a hit occurs within the cache, which also indicates that hit member vector 504 should be selected as the output at MUX 516. When the request misses at the cache, however, and a victim member is selected, the select signal forwards the victim member vector 511 as the output at MUX 516. Otherwise, when there is no operation or when the operation is aborted, a 0 vector is outputted.

The output of MUX 516 is routed to encode logic 520. Encode logic 520 takes the 8 bit vector and generates a 3 bit pointer corresponding to the vector (i.e., pointing to the location of the member identified by the vector selected at MUX 516), and the pointer is provided as one of two inputs to protect selection MUX 524. Protect selection MUX 524 receives the member protection bits as its second input. Select input 528 selects one of the two 3-bit inputs as the output of MUX 524. Select input 528 is received from select latch 428 and indicates whether the operation exhibits the particular attribute that causes member protection to be extended to the member receiving the new instruction. The select input 528 updates the protected bits to point to the member allocated to the hit/victim member.

When the operation's attribute indicates the new operation is an instruction (i.e., the operation exhibits the predetermined attribute for selecting a member to be protected), the select input 528 triggers selection of the input from encode logic 520 as the output from protect selection MUX 524. This output represents new LRU state bits 13-15 530, and points to the member to be protected. Otherwise, member protection bits 502 are selected (subject to possible de-selection at the member protection vector 503), and the LRU state bits 13-15 530 remains the same.

Hit/miss MUX 516 also provides three output lines utilized in generation of the three inputs to make MRU/LRU logic 526. The first output is to make root MRU 556, which is an 8 bit vector that triggers when the root bit (LRU state bit 0) is updated. As shown, the make root MRU 556 receives an input vector only when a hit member vector or a victim select vector is selected at MUX 516. When neither condition occurs, make root MRU 556 receives a null input and the root bit is not updated/toggled.

The second output from Hit/Miss MUX 516 is to OR logic 518, which has been described above. The hit member and/or selected victim member is made MRU (LRU bits 1-12) via this input, which triggers input 556. Finally, the third output is provided as input to second AND/NOT gate 552. The second input to AND/NOT gate 552 is anti-MRU vector 506, which selects the member in the I states as the member to make LRU. AND/NOT gate 554 provides a make LRU output vector which serves as the third input to make MRU/LRU logic 526. Accordingly, a member that is the anti-MRU member is only made LRU when that member is not also the hit member or the selected victim member. If the anti-MRU member is the current hit member of selected victim member, then the make LRU function/operation for that member is overridden, because the member cannot be both LRU and MRU at the same time. This override occurs because the selected victim is being replaced by a new valid entry, which becomes a MRU member and thus should not be tagged for LRU victim selection.

Output from augmented MRU update logic 512 thus includes all components of the new LRU state vector. These are LRU state bits 0, 1-12 532, indicating which member to select as LRU victim during the next victim selection process, as well as LRU state bits 13-15 530, pointing to/indicating the member, if any, within the congruence class to be protected. With FIG. 5A, a third output of new counter 531 is also provided. These output bits are then routed to and stored within LRU state array 403, replacing the previous LRU states within LRU state array 403.

The invention provides a "soft" Instruction-Most recently used (I-MRU) protection scheme whereby the selected MRU instruction is only protected for a limited number of eviction cycles unless that instruction cache line is updated/utilized during the period. An update or access to the instruction restarts the countdown that determines when the cache line is no longer protected as the I-MRU. Accordingly, only frequently used Instruction lines are protected, and old I-MRU lines age out of the cache. An old I-MRU cache line is evicted, such that all the members of a congruence class may be used for data. In one embodiment, the I-MRU aging is accomplished through a linear feedback shift register (LFSR)-based "shootdown" of I-MRU cache lines. The LFSR is tuned such that an I-MRU line will be protected for a pre-established number of evictions. The invention thus substantially reduces the sub-optimal performance exhibited from the continued protection of old instructions lines that are conventionally protected via I-MRU policies from being evicted from a second level, inclusive cache.

As a final matter, it is important to note that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such a floppy disks, hard disk drives, CD ROMs, and transmission type media such as digital and analogue communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A memory device comprising:
a first pipeline path, wherein one or more member protection bits are pipelined from a least recently used (LRU) state array to a most recently used (MRU) update logic, for selecting a least recently used (LRU) victim member of a congruence class;
a mechanism for protecting a specific member of the congruence class from selection as the LRU victim member for a duration of a pre-set number of eviction cycles by tagging the specific member as an instruction most recently used (I-MRU) member; and
an I-MRU timing logic that automatically removes the I-MRU tag of the specific member of the congruence class following completion of the pre-set number of eviction cycles without said I-MRU member being hit.

2. The memory device of claim 1, further comprising:
logic for determining when a current operation being processed is one of an instruction fetch and an access to the I-MRU member; and
when the current operation is one of an instruction fetch or an access to the I-MRU member:
  logic for selecting a member targeted by the current operation as the member that is to be I-MRU protected; and
  logic for resetting the I-MRU timing logic to a pre-established maximum time count.

3. The memory device of claim 2, further comprising:
a set of protection bits within an LRU state array, said protection bits having a value that indicates which of the congruence class is the pre-selected member; and
wherein the mechanism that protects the member further includes:
  logic for updating the value of the protection bits to point to the specific member; and
  logic for pipelining said protection bits concurrent with a pipelining of LRU state bits identifying the LRU victim member.

4. The memory device of claim 3, wherein said logic for pipelining includes:
logic for providing said protection bits to an MRU update logic that (a) determines which members of the congruence class are tagged as MRU and (b) which issues LRU state bits identifying a next victim member; and
logic for concurrently providing an attribute of the operation to said MRU update logic, said attribute utilized to determine whether the cache line targeted by the operation is an instruction line to be made a protected member.

5. The memory device of claim 3, further comprising:
a set of counter bits within the LRU state array, said counter bits utilized to track a number of elapsed cycles since an initial setting of the I-MRU timing logic to the pre-established maximum time count;
logic for decreasing a value of the counter bits after each cycle;
logic for determining when the value of the counter bits equals 0; and
logic, when the value of the counter bits equals 0, for de-selecting the pre-selected member from having I-MRU protection status, wherein said member is made available for selection by the least recently used (LRU) victim member selection process.

6. The memory device of claim 3, further comprising:
a linear feedback shift register (LFSR) which tracks a value of the number of elapsed cycles since the initial setting of the I-MRU timing logic to the pre-established maximum time count;
a Hit/Miss determining logic for determining when the I-MRU member is hit; and
when (a) the LFSR provides a true output, which indicates that the pre-established maximum time count has expired and (b) the Hit/Miss determining logic indicating no hit of the I-MRU member, logic for biasing a zero state of the protection bits of the LRU state array to a 0 value, such that any member identified by the zero state of the protection bits is not protected during LRU victim selection.

7. The memory device of claim 6, wherein said logic for biasing the zero state comprises means for grounding the decoded bit line for the zero state vector bit of the multiple vector bits decoded from the protection bits.

8. In a memory component, a method comprising:
protecting a specific member of the congruence class from selection as an LRU victim member for a duration of a pre-set number of eviction cycles by tagging the specific member as an instruction most recently used (I-MRU) member; and
an I-MRU timing logic automatically removing the I-MRU tag of the specific member of the congruence class following completion of the pre-set number of eviction cycles without said I-MRU member being hit.

9. The method of claim 8, further comprising:
determining when a current operation being processed is one of an instruction fetch and an access to the I-MRU member; and
when the current operation is one of an instruction fetch or an access to the I-MRU member:
  selecting the member targeted by the operation as the member that is to be I-MRU protected; and
  resetting the I-MRU timing logic to a pre-established maximum time count.

10. The method of claim 9, further comprising:
receiving a set of protection bits from within an LRU state array, said protection bits having a value that indicates which of the congruence class is the pre-selected member;
pipelining said protection bits concurrent with a pipelining of LRU state bits identifying the LRU victim member along an LRU victim selection pipeline path; and
updating the value of the protection bits to point to the specific member.

11. The method of claim 8, further comprising:
receiving a set of counter bits from within the LRU state array, said counter bits utilized to track a number of elapsed cycles since an initial setting of the I-MRU timing logic to the pre-established maximum time count;
decreasing a value of the counter bits after each cycle;
determining when the value of the counter bits equals 0; and
when the value of the counter bits equals 0, de-selecting the pre-selected member from having I-MRU protection status, wherein said member is made available for selection by the least recently used (LRU) victim member selection process.

12. The method of claim 11, further comprising:
providing said protection bits to an MRU update logic that (a) determines which members of the congruence class are tagged as MRU and (b) which issues LRU state bits identifying a next victim member; and
concurrently providing an attribute of the operation to said MRU update logic, said attribute utilized to determine whether the cache line targeted by the operation is an instruction line to be made a protected member.

13. The method of claim 9, further comprising:
receiving input from a linear feedback shift register (LFSR) which tracks a value of the number of elapsed cycles since the initial setting of the I-MRU timing logic to the pre-established maximum time count;
receiving a second input from a Hit/Miss determining logic for determining when the I-MRU member is hit; and
when (a) the LFSR provides a true output, which indicates that the pre-established maximum time count has expired, and (b) the Hit/Miss determining logic does not indicate a hit of the I-MRU member, automatically biasing a zero state of the protection bits of the LRU state array to a 0 value, such that any member identified by the zero state vector of the protection bits is not protected during LRU victim selection.

14. The method of claim 13, wherein said automatically biasing the zero bit comprises grounding the decoded bit line for the zero state vector bit of the multiple vector bits decoded from the protection bits.

15. A computer system, comprising:
a processor; and
a memory component connected to said processor and having:
a first pipeline path, wherein one or more member protection bits are pipelined from a least recently used (LRU) state array to a most recently used (MRU) update logic, for selecting a least recently used (LRU) victim member of a congruence class;
a mechanism for protecting a specific member of the congruence class from selection as the LRU victim member for the duration of a pre-set number of eviction cycles by tagging the specific member as an instruction most recently used (I-MRU) member; and
an I-MRU timing logic that automatically removes the I-MRU tag of the specific member of the congruence class following completion of the pre-set number of eviction cycles without said I-MRU member being hit.

16. The computer system of claim 15, said memory component further comprising:
logic for determining when a current operation being processed is one of an instruction fetch and an access to the I-MRU member; and
when the current operation is one of an instruction fetch or an access to the I-MRU member:
logic for selecting the member targeted by the operation as the member that is to be I-MRU protected; and
logic for resetting the I-MRU timing logic to a pre-established maximum time count.

17. The computer system of claim 16, said memory component further comprising:
a set of protection bits within an LRU state array, said protection bits having a value that indicates which of the congruence class is the pre-selected member; and
wherein the mechanism that protects the member further includes:
logic for updating the value of the protection bits to point to the specific member; and
logic for pipelining said protection bits concurrent with a pipelining of LRU state bits identifying the LRU victim member, wherein said logic for pipelining includes:
logic for providing said protection bits to an MRU update logic that (a) determines which members of the congruence class are tagged as MRU and (b) which issues LRU state bits identifying a next victim member; and
logic for concurrently providing an attribute of the operation to said MRU update logic, said attribute utilized to determine whether the cache line targeted by the operation is an instruction line to be made a protected member.

18. The computer system of claim 15, said memory component further comprising:
a set of counter bits within the LRU state array, wherein said counter bits are utilized to track a number of elapsed cycles since an initial setting of the I-MRU timing logic to the pre-established maximum time count;
logic for decreasing a value of the counter bits after each cycle;
logic for determining when the value of the counter bits equals 0; and
logic, when the value of the counter bits equals 0, for de-selecting the pre-selected member from having I-MRU protection status, wherein said member is made available for selection by the least recently used (LRU) victim member selection process.

19. The computer system of claim 15, said memory component further comprising:
a linear feedback shift register (LFSR) which tracks a value of a number of elapsed cycles since the initial setting of the I-MRU timing logic to a pre-established maximum time count;
a Hit/Miss determining logic for determining when the I-MRU member is hit; and
when (a) the LFSR provides a true output, which indicates that the pre-established maximum time count has expired and (b) the Hit/Miss determining logic indicating no hit of the I-MRU member, logic for biasing a zero state of the protection bits of the LRU state array to a 0 value, such that any member identified by the zero state of the protection bits is not protected during LRU victim selection.

20. The computer system of claim 16, wherein said logic for biasing the zero bit comprises means for grounding the decoded bit line for the zero state vector bit of the multiple vector bits decoded from the protection bits.

* * * * *